United States Patent [19]
Ratliff

[11] 4,216,635
[45] Aug. 12, 1980

[54] HOLLOW PANEL STRUCTURE AND METHOD FOR THE CONSTRUCTION THEREOF

[75] Inventor: Roger D. Ratliff, Irving, Tex.

[73] Assignee: PepsiCo, Inc., Purchase, N.Y.

[21] Appl. No.: 671,299

[22] Filed: Mar. 29, 1976

[51] Int. Cl.² ............................................. E04B 5/52
[52] U.S. Cl. ..................................... 52/481; 52/829; 29/428; 29/462
[58] Field of Search ................. 52/615, 588, 480, 619, 52/579, 620, 481; 29/428, 462

[56] References Cited
U.S. PATENT DOCUMENTS

| | | | |
|---|---|---|---|
| 3,001,614 | 9/1961 | Shane | 52/619 |
| 3,304,677 | 2/1967 | Pavlecka | 52/620 X |
| 3,412,514 | 11/1968 | Giovannucci | 52/588 X |

FOREIGN PATENT DOCUMENTS 606167  11/1934  Fed. Rep. of Germany ............. 52/481

*Primary Examiner*—Price C. Faw, Jr.
*Assistant Examiner*—Carl D. Friedman
*Attorney, Agent, or Firm*—Scully, Scott, Murphy & Presser

[57] ABSTRACT

A hollow panel structure applicable as a wall partition, divider member and the like, constituted of a plurality of channel-shaped elements arranged in two parallel spaced rows having their flanges facing each other. The rows of elements are interconnected into a rigid, box-like structure through the intermediary of transverse spacer elements extending between the adjacent flanges of adjoining channel-shaped elements. The method of construction for the panel structure employs spot welds for interconnecting the channel-shaped elements and the spacer elements to facilitate ready removal and replacement of individual channel-shaped elements.

12 Claims, 6 Drawing Figures

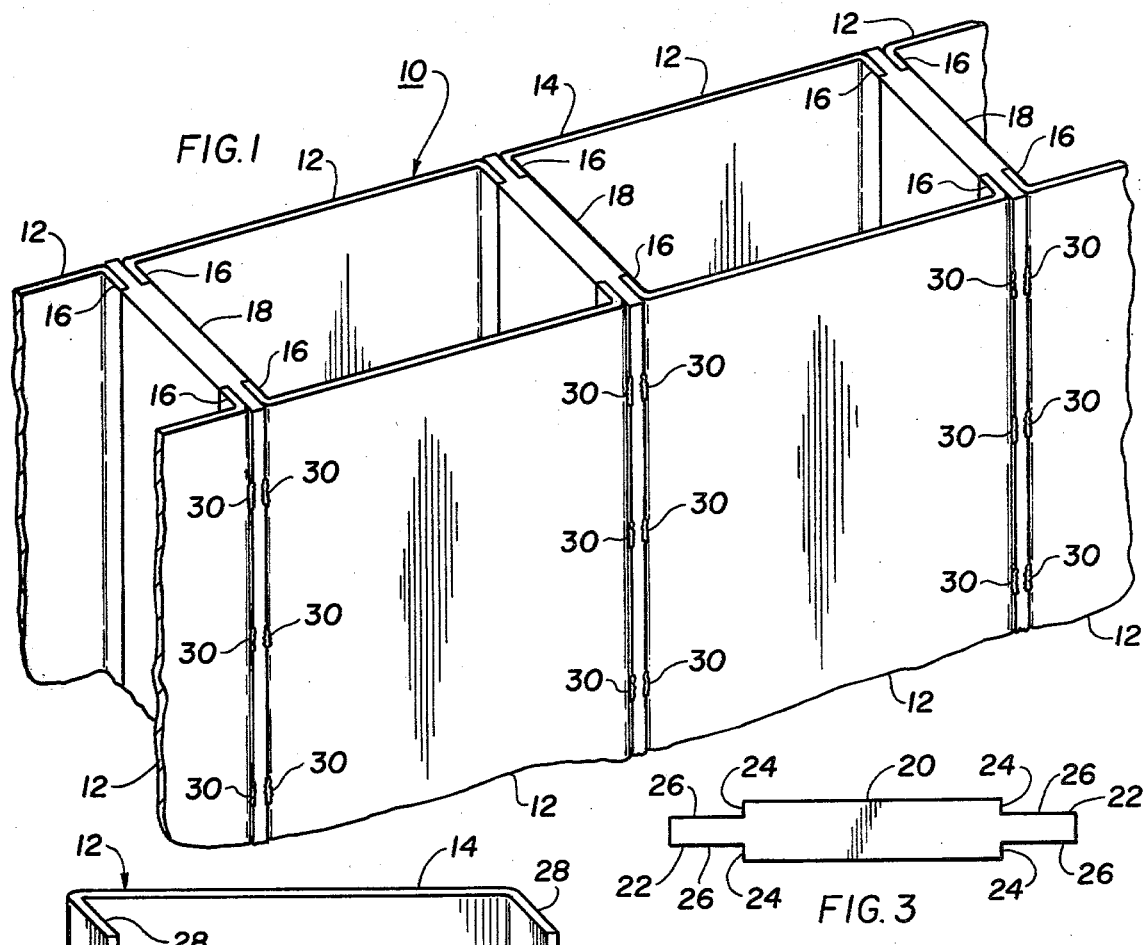
FIG.1
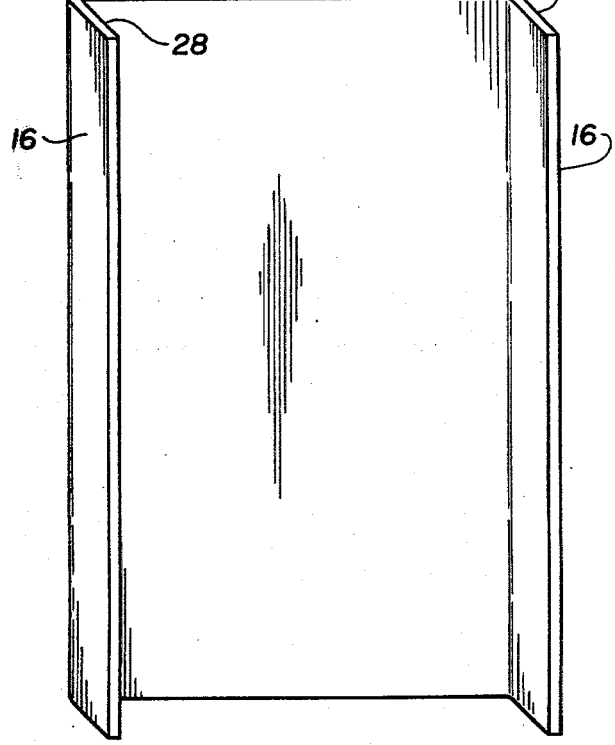
FIG.2
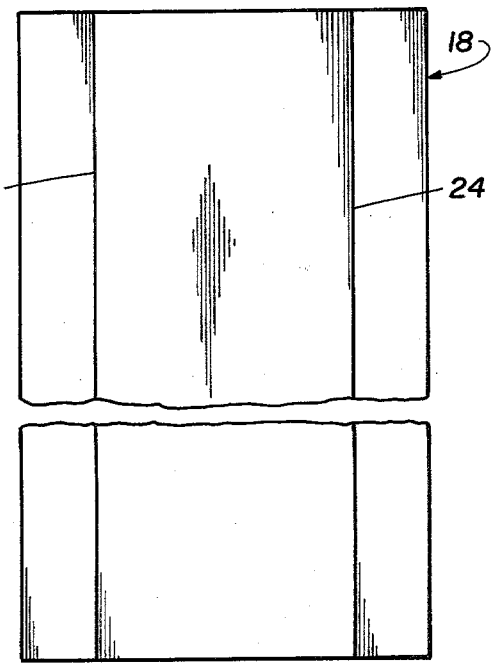
FIG.3
FIG.4

HOLLOW PANEL STRUCTURE AND METHOD FOR THE CONSTRUCTION THEREOF

FIELD OF THE INVENTION

The present invention relates to a hollow panel structure, and particularly a panel structure which may be utilized as a wall partition, divider member and the like for temporary or permanent building constructions and in vehicles, and also relates to a method for the construction thereof.

Quite often, it is desirable to employ hollow panel structures which are of light-weight, and constructed of a plurality of assembled components adapted to be simply and readily replaced by other similar components. Frequently, portions or sections of hollow panel structures which are employed as wall partitions in buildings, or as divider elements in transport vehicles and the like are subjected to extensive damage. This, of necessity, may require the replacement of the entire wall or divider member, or at least necessitate the removal thereof and repair or replacement of the damaged section at a remote site. As a result, the installation and maintenance of such panel structures has, heretofore, been proven to be quite cumbersome and unduly expensive.

SUMMARY OF THE INVENTION

Accordingly, it is an object of the present invention to provide a novel and unique hollow panel structure readily employable as a wall partition, divider member and the like for buildings and transport vehicles, which is of relatively light-weight, while evidencing a high degree of rigidity and strength.

Another object of the present invention is to provide a hollow panel structure of a light-weight metal construction constituted of a plurality of components which are adapted to be readily and quickly assembled to provide a wall partition for temporary or permanent building structures, or a divider member for a transport vehicle, and which can be easily serviced for the replacement of any damaged portions or sections thereof without the need for skilled labor or specialized tools.

A further object of the present invention is to provide a hollow panel structure which is primarily constructed of channel-shaped structural elements arranged in two parallel spaced rows having their flanges facing each other, and which are fixedly interconnected in a rigid, box-like manner through the intermediary of light-weight spacer elements.

A still further object of the present invention is to provide a hollow panel structure which is mounted within a frame arrangement for particular use as a cargo or storage area divider member in transport vehicles and the like.

Yet another object of the present invention is to provide a novel method of constructing a hollow panel structure of the above indicated type.

BRIEF DESCRIPTION OF THE DRAWINGS

Reference may now be had to the following detailed description of exemplary embodiments of the invention, taken in conjunction with the accompanying drawings; in which:

FIG. 1 illustrates a perspective view of a hollow panel structure constructed pursuant to the present invention;

FIG. 2 is a perspective view of one of the channel-shaped elements employed in the hollow panel structure of FIG. 1;

FIG. 3 is a top plan view of one of the spacer elements employed in the hollow panel structure of FIG. 1;

FIG. 4 is a side elevational view of the spacer element of FIG. 3;

DETAILED DESCRIPTION

Figure 5:
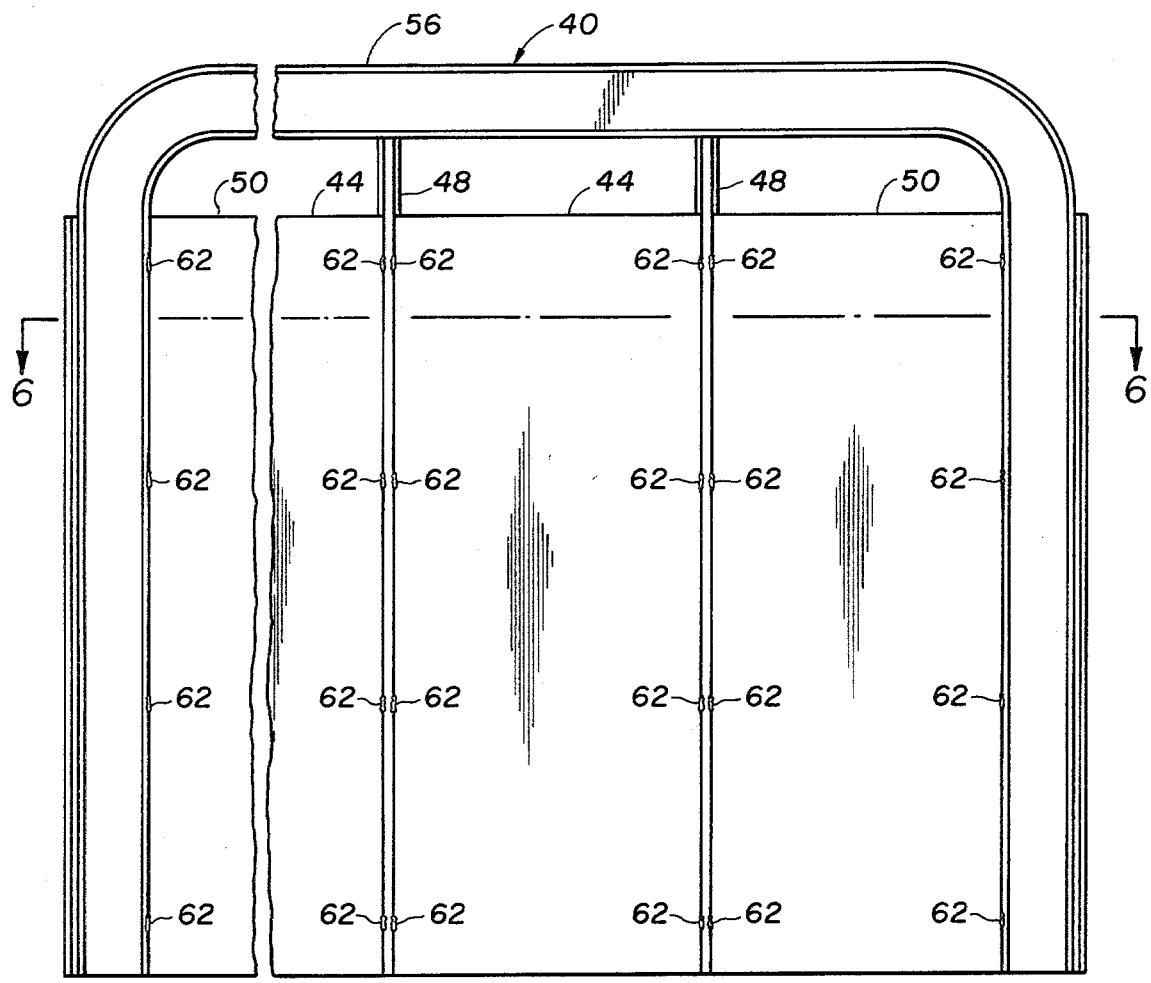
FIG. 5 is a front elevational view of the hollow panel structure mounted within a frame arrangement for particular use as a divider member in a transport vehicle.

An important aspect in the utilization of hollow panel structures for walls or divider members in vehicles and the like lies in the capability of readily and quickly replacing segments or sections of the hollow panel structure which may have been damaged during use thereof. Furthermore, in another aspect, the hollow panel structure should permit such repairs to be effected in situ in the absence of highly skilled personnel or complicated tools, and without the need for disassembling major portions of or even the entire hollow panel structure.

Moreover, the hollow panel structure should be of a light-weight construction, preferably constituted of aluminum or the like, while concomitantly possessing sufficient structural strength and rigidity to warrant its use in wall partitions and divider members for transport vehicles at locations where it may be subjected to high impact and shock loads without being excessively damaged.

The present invention, in order to meet the requirements set forth hereinabove, thus contemplates the provision of a unique hollow panel structure which is applicable to a building wall partition, divider member for cargo transport vehicles and the like.

Basically, the hollow panel structure is constituted of a plurality of essentially channel-shaped panels or elements each having a flat central portion and upstanding end flanges, which are arranged in parallel spaced rows having the flanges of the opposite rows facing towards each other. A predetermined spacing is afforded between the two rows of the channel-shaped elements by means of spacer elements which extend along the longitudinal lengths of the panels transversely between the flanges of adjoining and oppositely spaced channel-shaped panel elements. Preferably, the spacer elements are each formed of sections or lengths of extruded aluminum plate, with the lateral end portion thereof which extend between the flanges having recesses formed in the opposite surfaces thereof adapted to engage the flanges of the channel-shaped members in a mating relationship. The channel-shaped panel elements may be spot-welded to the spacer elements at suitable intervals in order to provide a rigid, box-like construction for the hollow panel structure, which is of essentially light-weight while affording a high degree of strength and rigidity.

In another aspect of the invention, in which the hollow panel structure is particularly adapted for use as cargo bay divider member in a transport vehicle, such as is disclosed in applicant's copending U.S. patent application Ser. No. 671,139, now U.S. Pat. No. 4,043,369, the panel structure is encompassed along at or proximate to least three edges thereof by a generally inverted U-shaped frame arrangement, the latter of which may be constructed of suitable angle and channel members. This inverted U-shaped frame arrangement will impart an extremely high degree of structural rigidity and strength to the entire hollow panel structure and adapt the latter for particular use as a divider member for the cargo bays in a transport vehicle.

Referring now in detail to the drawings and particularly FIGS. 1 through 4, FIG. 1 shows a perspective view of a hollow panel structure 10 constructed pursuant to the invention.

Hollow panel structure 10 is essentially constituted of a plurality of channel-shaped panels or elements 12 aligned in two parallel spaced rows, each panel comprising a generally planar or flat central portion 14, as shown in FIG. 2, having upstanding flange portions 16 formed along the edges thereof. Preferably, although not necessarily, the channel-shaped elements 12 are each constructed of aluminum sheet which may have been either bent into a channel from a flat plate, or may have been extruded. Obviously, other materials such as steel or plastics may also be readily employed.

Interposed between the respective adjacent or contiguous flanges 16 of adjoining channel-shaped elements 12 are spacer elements 18 extending between the spaced rows of elements 12, so as to cause the channel-shaped elements 12 to be oriented into the above-mentioned parallel aligned rows, thereby forming an essentially rigid, box-like hollow panel structure.

As shown in FIGS. 3 and 4 of the drawings, each spacer element 18 is constituted of a section or length of a metallic plate, preferably of light-weight extruded aluminum, and has a central portion 20 of substantially rectangular cross-sectional configuration. The central portion 20, at either end thereof, extends into reduced cross-section end portions 22 which are set back or recessed in depth at either side thereof along surfaces 24 in an amount generally equal to the thickness of flanges 16 on channel-shaped elements 12. Furthermore, the length 26 of each end portion 22 is approximately equal to the length 28 of the flange 16 on each channel-shaped panel or element 12. Consequently, when the channel-shaped elements 12 and spacer elements 18 are assembled into a hollow panel structure 10 as shown in FIG. 1, the flanges 16 will be matingly engaged in the corresponding recessed end portions 22 of each of the spacer elements 18 so as to provide, in conjunction with the latter, an essentially rectangular cross-section extending transversely between the parallel spaced rows of channel-shaped elements 12.

The spacer elements 18 are fastened to the adjoining channel-shaped elements 12 through the intermediary of suitably spaced spot welds 30 which are arranged along the outwardly projecting end surface edges of end portions 22 at the locations where the flanges 16 curve into the flat central portions 14 of each of the respective channel-shaped elements 12.

The utilization of spaced spot welds 30 as the fastening means between elements 12 and 18 allows for effectuation of simple and ready removal of a channel-shaped element or panel section 12 when the latter is damaged in use thereof without the need for skilled personnel or the use of special tools. Thus, by simply chipping or cutting through the respective spot welds 30 holding the damaged panel 12 in place in the structure 10, it is possible to withdraw the damaged element 12, and to replace it with a new panel or element 12 the latter of which may then be welded on the spacer element 18 by means of new spot welds. This particular procedure may take place on site without necessitating removal of the remainder of the panel structure from either the wall or from the divider member in the transport vehicle.

Figure 6:
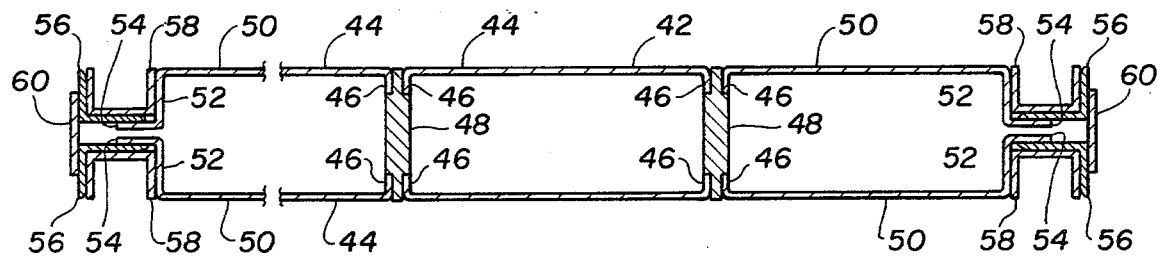
FIG. 6 is a sectional view taken along line 6—6 in FIG. 5.

Illustrative of a specialized application of the hollow panel structure 12 as a cargo bay divider member in a transport vehicle or the like, reference may now be had to FIGS. 5 and 6 of the drawings.

Thus, in this embodiment of the invention, a divider arrangement 40 includes a hollow panel structure 42 constituted of a plurality of channel-shaped panels or elements 44, each element having upstanding flange portions 46 along the opposite edges thereof, and arranged in two parallel spaced rows. The channel-shaped elements or panels 44 are interconnected to form a rigid box-like structure through the intermediary of spacer elements 48 extending transversely between the two rows of elements 44 so as to have their ends project intermediate the adjacent or contiguous flanges 46 of adjoining elements 44. To the extent described, panel structure 42 is identical to hollow panel structure 10 as shown in FIG. 1 of the drawings.

In this particular construction, the hollow partition structure 42 includes channel-shaped elements 50 at the opposite extreme ends thereof, each having lengthier flanges 52 at their respective outer ends extending into closely spaced parallel protuberances 54.

The outer surfaces of the parallel spaced protuberances 54 are each engaged by angle members 56 extending in a generally inverted U-shaped configuration along at or proximate to least three edges of the panel structure 42. Arranged in the hollows between the angle members 56 and flanges 52 are channel members 58 of generally U-shaped configuration and which are coextensive with the inverted U-shaped frame in order to provide stiffening support to the frame. Suitable connecting plates 60 may be welded to the outer flanges of angle members 56 in order to interconnect the latter into a rigid frame arrangement encompassing at least three side edges of the hollow panel structure 42.

The upper ends of the spacer elements 48 may project upwardly beyond the upper edges of panel elements 44 into contact with the lower surface of the upper portion of the frame structure, and may be welded to the latter along suitable locations.

The entire divider member or panel structure 40 may be mounted in a transport vehicle as disclosed in applicants' copending U.S. Pat. application Ser. No. 671,139, now U.S. Pat. No. 4,043,369, thereby dividing the interior of the transport vehicle into suitable cargo-receiving and supporting bays.

As becomes readily apparent, in the event that any of the panels 44 are damaged during use of the panel structure 42, it is a relatively simple procedure to cut or chip the spot welds 62 which fasten the panels to the associated spacer elements 48, then remove the damaged panel and to replace it with a new and undamaged panel, and thereafter weld the latter to the spacer elements 48 between which it is located. This relatively simple procedure can be carried out by relatively unskilled personnel in situ without the need for employing special or complex tools. Thus, being able to repair the panel structure 42 by simple replacement of one or more damaged panel elements 44 without disturbing the undamaged sections of the structure, renders the entire arrangement highly economical in use.

Quite obviously, the end panel elements 50, upon being damaged, may be removed in a similar manner by chipping through or cutting spot welds 62 fastening them to associated spacer element 48 and angle members 56, and replacing them with new, undamaged panel elements.

Although the hollow panel structure pursuant to the invention has been described as being primarily constituted of aluminum components, it becomes readily apparent to one skilled in the art that other types of materials such as steel or plastics, may be employed, depending upon the particular intended area of application for the hollow panel structure. Furthermore, although the hollow panel structure has been described in connection with its utilization as a wall partition, or as a cargo space divider member in a transport vehicle, it may also be readily employed as a fire door or for a sound-proofing structure, and the enumerated uses are to be considered as being only exemplary and not limitative.

What is claimed is:

1. A method of constructing a hollow panel structure applicable as a wall partition, divider member and the like, comprising the steps of:
   (a) positioning a plurality of generally channel-shaped elements each having a substantially flat central portion and upstanding flange portions along the opposite longitudinal edges thereof in two parallel spaced rows with the flange portions of the opposite rows extending towards each other;
   (b) interposing spacer elements between said two rows of channel-shaped elements, the end portions of each spacer element extending intermediate adjoining flange portions of adjacent channel-shaped elements, said spacer elements having recess surface portions formed in the opposite end regions thereof, the flange portions of said channel-shaped elements being matingly received in corresponding of said recesses;
   (c) and fastening said channel-shaped elements to said spacer elements to thereby form a rigid, essentially box-like hollow panel structure.

2. A method as claimed in claim 1, comprising spot-welding said channel-shaped elements to said spacer elements.

3. A method as claimed in claim 1, comprising fastening angle members to the outermost flange portions of the opposite end channel-shaped elements of said panel structure, said angle members forming an encompassing frame for said structure.

4. A method as claimed in claim 3, said angle members encompassing at least three side edges of said panel structure in an essentially inverted U-shaped frame assembly.

5. A method as claimed in claim 3, comprising positioning U-shaped channel members in the hollows formed between said angle members and the outermost flange portions of the end channel-shaped elements.

6. A method as claimed in claim 3, comprising welding said angle members to each other.

7. A hollow panel structure applicable as a wall partition, divider member and the like, comprising:
   (a) a plurality of generally channel-shaped elements, each said element having a flat central portion and upstanding flange portions formed along the opposite longitudinal edges thereof, said elements being arranged in two parallel spaced rows having the flange portions of the rows extending towards each other;
   (b) spacer elements being located between said two rows of channel-shaped elements, one each of said spacer elements respectively extending intermediate the adjoining flange portions of adjacent of said elements, each said spacer element comprising a generally flat plate member having a uniform thickness in cross-section, rectangular setbacks being formed in the opposite outer side wall surfaces of said flat plate member to thereby form end portions each being a single flat plate of reduced cross-sectional thickness, said setbacks being adapted to receive respectively one said flange portion in cooperatively mating engagement between the outer exposed surfaces thereof;
   (c) means for fastening said channel-shaped elements to said spacer elements to form a rigid, essentially box-like hollow panel structure; and
   (d) the outermost flange portions of the channel-shaped elements at the ends of each of said rows including closely spaced protuberances extending in parallel spaced relationship, angle members being fastened to said spaced protuberances and coextensive therewith to form encompassing frame means for said panel structure.

8. A panel structure as claimed in claim 7, said angle members encompassing at least three side edges of said panel structure in an essentially inverted U-shaped frame assembly.

9. A panel structure as claimed in claim 7, comprising U-shaped channel members being positioned in the hollows between said angle members and the outermost flange portions of said channel-shaped elements.

10. A panel structure as claimed in claim 9, said angle members and said U-shaped channel members each being constituted of aluminum.

11. A panel structure as claimed in claim 7, comprising fastening means interconnecting said angle members.

12. A hollow panel structure as recited in claim 7, wherein said hollow panel structure forms a wall in a transport vehicle.

* * * * *